US012744788B2

(12) United States Patent
Anderson et al.

(10) Patent No.: US 12,744,788 B2
(45) Date of Patent: Sep. 22, 2026

(54) SYSTEM AND METHOD OF BUSINESS ROLE MINING

(71) Applicant: ROYAL BANK OF CANADA, Montreal (CA)

(72) Inventors: Shawn Anderson, Toronto (CA); Courtney Wright, Toronto (CA); Cleo Tracey, Toronto (CA); Priyansh Narang, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 134 days.

(21) Appl. No.: 16/541,604

(22) Filed: Aug. 15, 2019

(65) Prior Publication Data

US 2020/0059476 A1 Feb. 20, 2020

Related U.S. Application Data

(60) Provisional application No. 62/764,701, filed on Aug. 15, 2018.

(51) Int. Cl.
*H04L 9/40* (2022.01)
*G06F 16/22* (2019.01)
(Continued)

(52) U.S. Cl.
CPC ........ *H04L 63/105* (2013.01); *G06F 16/2237* (2019.01); *G06F 16/285* (2019.01); *G06Q 10/063112* (2013.01)

(58) Field of Classification Search
CPC . H04L 63/105; G06F 16/2237; G06F 16/285; G06Q 10/063112
(Continued)

(56) References Cited

U.S. PATENT DOCUMENTS 8,359,652 B2 * 1/2013 Bhagwan .............. G06F 21/604 726/1
8,978,104 B1 * 3/2015 Wilkinson .......... G06F 21/6218 709/217
(Continued)

OTHER PUBLICATIONS

Jaideep Vaidya, "The Role Mining Problem: Finding a Minimal Descriptive Set of Roles" National Science Foundation under grant IIS-0306838 (Year: 2007).*
(Continued)

*Primary Examiner* — Abdallah A El-Hage Hassan
(74) *Attorney, Agent, or Firm* — NORTON ROSE FULBRIGHT CANADA LLP

(57) ABSTRACT

A system, non-transitory computer-readable medium, and method for approving access permissions are provided. The system comprises at least one processor and memory storing instructions which when executed by the at least one processor configure the at least one processor to perform the method. The non-transitory computer-readable medium has instructions thereon, which when executed by a processor, perform the method. The method comprises transforming enterprise access data into data sets, identifying business roles based on common patterns of the access data, presenting at least one business role assignable to an employee to an access manager, and receiving an approval indication input associated with the access manager assigning the business role to the employee. The business roles comprises at least one access point associated with the access data.

15 Claims, 12 Drawing Sheets

(51) Int. Cl.
*G06F 16/28* (2019.01)
*G06Q 10/0631* (2023.01)

(58) Field of Classification Search
USPC .......................................................... 705/7.14
See application file for complete search history.

(56) References Cited

U.S. PATENT DOCUMENTS

| | | | | |
|---|---|---|---|---|
| 9,020,971 | B2 * | 4/2015 | Bayliss | G06F 16/285<br>707/770 |
| 10,862,928 | B1 * | 12/2020 | Badawy | G06F 21/604 |
| 2007/0214497 | A1 * | 9/2007 | Montgomery | G06F 21/6218<br>726/4 |
| 2010/0312726 | A1 * | 12/2010 | Thompson | G06N 5/022<br>706/54 |
| 2012/0246098 | A1 * | 9/2012 | Chari | G06N 20/00<br>706/12 |
| 2018/0124062 | A1 * | 5/2018 | Scott | H04L 63/105 |
| 2018/0165475 | A1 * | 6/2018 | Veeramachaneni | G06F 21/6254 |
| 2019/0258818 | A1 * | 8/2019 | Yu | G06N 20/00 |

OTHER PUBLICATIONS

Dana Zhang (Role engineering using graph optimisation) SACMAT '07: Proceedings of the 12th ACM symposium on Access control models and technologies Jun. 2007 pp. 139-144 https://doi.org/10.1145/1266840.1266862 (Year: 2007).*

* cited by examiner

1000

| Employee Number | FR1 | FR2 | FR3 | FR4 | FR5 | FR6 | FR7 | FR8 | FR9 | FR10 | Bufugu C12 | Bufugu C20 | City Calgary | City Toronto | Transit Number 3536 | Transit Number 7189 | Transit Number 18026 | Transit Number 18048 |
|---|---|---|---|---|---|---|---|---|---|---|---|---|---|---|---|---|---|---|
| 1 | 0 | 1 | 1 | 0 | 1 | 1 | 0 | 0 | 1 | 0 | 1 | 0 | 0 | 1 | 1 | 0 | 0 | 0 |
| 2 | 0 | 0 | 0 | 1 | 1 | 0 | 0 | 1 | 0 | 0 | 1 | 0 | 0 | 1 | 1 | 0 | 0 | 0 |
| 3 | 1 | 0 | 0 | 1 | 0 | 0 | 0 | 0 | 0 | 1 | 0 | 1 | 0 | 1 | 0 | 0 | 1 | 0 |
| 4 | 0 | 0 | 0 | 1 | 1 | 0 | 0 | 1 | 0 | 0 | 1 | 0 | 0 | 1 | 1 | 0 | 0 | 0 |
| 5 | 0 | 1 | 0 | 0 | 0 | 0 | 0 | 0 | 0 | 0 | 1 | 0 | 0 | 1 | 1 | 0 | 0 | 0 |
| 6 | 0 | 1 | 0 | 0 | 0 | 0 | 0 | 0 | 0 | 0 | 1 | 0 | 1 | 0 | 0 | 1 | 0 | 0 |
| 7 | 0 | 1 | 1 | 0 | 0 | 0 | 0 | 0 | 0 | 0 | 0 | 1 | 1 | 0 | 0 | 0 | 0 | 1 |
| 8 | 0 | 0 | 0 | 0 | 1 | 0 | 1 | 1 | 1 | 1 | 1 | 0 | 1 | 0 | 0 | 1 | 0 | 0 |
| 9 | 0 | 0 | 0 | 1 | 0 | 1 | 0 | 1 | 0 | 1 | 1 | 0 | 1 | 0 | 0 | 1 | 0 | 0 |
| 10 | 0 | 1 | 1 | 0 | 0 | 0 | 0 | 0 | 0 | 0 | 1 | 0 | 1 | 0 | 0 | 1 | 0 | 0 |

FIG. 10

SYSTEM AND METHOD OF BUSINESS ROLE MINING

CROSS-REFERENCE TO RELATED APPLICATIONS

This application claims all benefit including priority to U.S. Provisional Patent Application 62/764,701, filed Aug. 15, 2018, and entitled: "SYSTEM AND METHOD OF BUSINESS ROLE MINING," which is hereby incorporated by reference in its entirety.

FIELD

The present disclosure generally relates to the field of machine learning, and in particular to a system and method of business role mining.

INTRODUCTION

Access privileges and permissions may be provided by an access manager to an employee of an enterprise. In large enterprises, the number of access points for a given employee may be numerous. Managing access, including adding, deleting or changing access, for employees in a large organization can be an onerous undertaking.

SUMMARY

In accordance with an embodiment, there is provided a system for method for approving access permissions. The system comprises at least one processor and a memory storing code which when executed by the at least one processor configures the at least one processor to transform enterprise access data into data sets, identify business roles based on common patterns of the access data, present at least one business role assignable to an employee to an access manager, and receive an approval indication input associated with the access manager assigning the business role to the employee. The business roles comprises at least one access point associated with the access data.

In accordance with another embodiment, there is provided a method of method for approving access permissions. The method comprises transforming enterprise access data into data sets, identifying business roles based on common patterns of the access data, presenting at least one business role assignable to an employee to an access manager, and receiving an approval indication input associated with the access manager assigning the business role to the employee. The business roles comprises at least one access point associated with the access data.

In accordance with another embodiment, there is provided a non-transitory computer-readable medium having instructions thereon which, when executed by a processor, perform a method of approving access permissions. The method comprises transforming enterprise access data into data sets, identifying business roles based on common patterns of the access data, presenting at least one business role assignable to an employee to an access manager, and receiving an approval indication input associated with the access manager assigning the business role to the employee. The business roles comprises at least one access point associated with the access data.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures:

FIG. 10 illustrates, in a table, the transformed data, in accordance with some embodiments.

It is understood that throughout the description and figures, like features are identified by like reference numerals.

DETAILED DESCRIPTION

Figure 1:
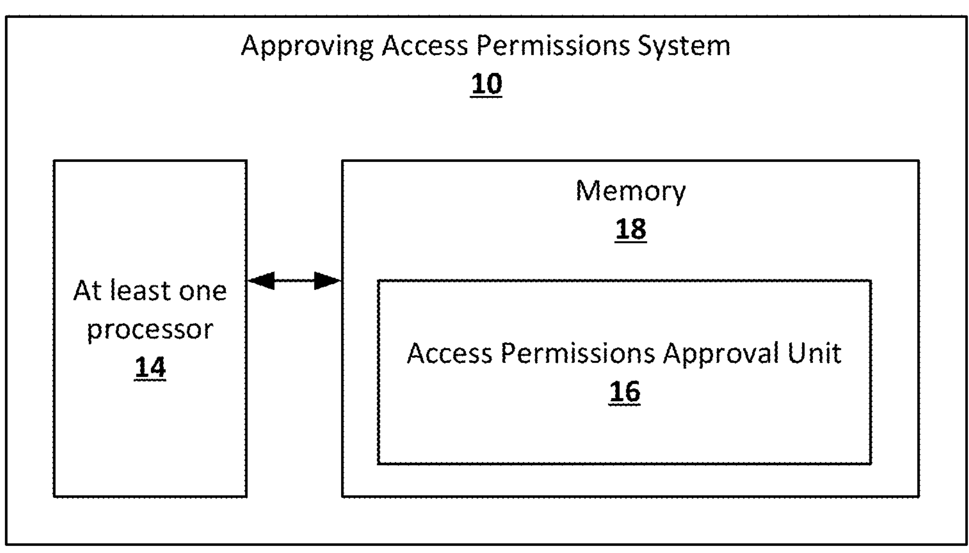
FIG. 1 illustrates, in a block diagram, an example of a system for approving access permissions, in accordance with some embodiments.

Embodiments of methods, systems, and apparatus are described through reference to the drawings.

In some embodiments, the business role mining method described herein is a scalable solution that can be applied to uncover access patterns across small teams with the handful of employees as well as across large organizations with thousands of employees. One use is in creation of functional and business roles in an effort to standardize employee access, reduce the risk of unauthorized access and improve efficiency and effectiveness of the access reviews. The use can be extended to access provisioning (where the business roles can be used to validate employee access requests) as well as in detection of anomalies in access provisioning (under or over provisioning of the user access).

Embodiments described herein relate to machine learning which is a field of computer science that configures computing devices to process data using programming rules and code that can dynamically update over time. Machine learning involves programming rules and code that can detect patterns and generate output data that represents predictions or forecasting. Role mining is the process of using machine learning techniques to find and extract patterns in existing access data in pursuit of minimizing effort required for access management, and to minimize risk associated with access. By clustering permissions into common patterns that can be packaged into business roles, managers may review and approve a single business role for an employee, rather than reviewing every granular instance of access that that employee requires to do their job.

The disclosure will describe an embodiment of business role mining from the perspective of a capital market implementation. It is understood that other implementations and other embodiments are possible.

Access privileges and permissions for employees may be managed by access managers in an enterprise. Many enterprises have regulations or policies regarding review and approval of access points. Managing access (including adding, deleting or changing access) for employees in a large organization can be an onerous undertaking. When an employee is on-boarded, leaves or changes roles, the employees' access privileges to enterprise systems change. Also, when a new sub-system is added to an enterprise system that requires access privileges, privileges to many employees in the enterprise may change.

Standardized access may provide efficiencies when onboarding new employees, changing employee roles, or adding access privileges to numerous employees. This is especially so for large enterprises that have numerous employees, and enterprises sub-systems for which different employees require access. Even small enterprises that employ non-standardized access structures may benefit from standardized access taught herein. Other perspectives (other than scale of enterprise) may be used, such as segregation of duties/roles in the model. Ultimately, by have such a model of roles that employees should have may assist with reducing risk of providing access to the wrong employees.

FIG. 1 illustrates, in a block diagram, an example of a system for approving access permissions 10, in accordance with some embodiments. The system 10 comprises at least one processor 14 and a memory 18 storing instructions which when executed by the at least one processor 14 configure the at least one processor 14 to perform a method of approving access permissions as stored in the access permission approval unit 16. Other components may be added to the system 10 which may also be integrated into a larger system.

Figure 2:
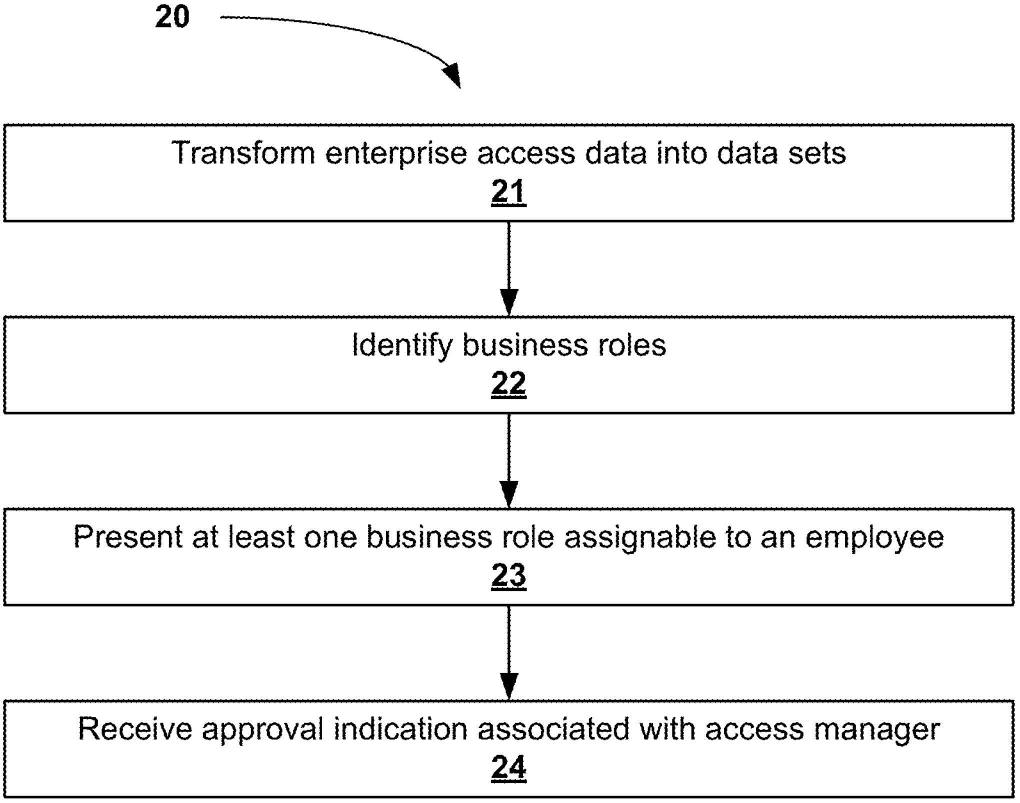
FIG. 2 illustrates, in a flowchart, an example of a method of approving access permissions, in accordance with some embodiments.

FIG. 2 illustrates, in a flowchart, an example of a method of approving access permissions 20, in accordance with some embodiments. The method 20 may be stored as instructions in the memory 18 and performed by the at least one processor 14. The method 20 comprises transforming 21 enterprise access data into data sets that may be analysed. Examples of enterprise access data include access to database data, application data, infrastructure data, financial books data, human resources data, transits data, and other data where access is restricted. An example of the transforming step 21 is provide below (see Tables 1 to 3). Next, business roles may be identified 22 based on common patterns of the access data, as will be further described below with reference to FIGS. 5A to 5C. The business roles may comprise at least one access point associated with the access data. Next, at least one business role assignable to an employee may be presented 23 to an access manager. Next, an approval indication input associated with the access manager may be received 24 which assigns the business role to the employee. At this point, the employee is automatically assigned access permissions associated with the business role.

Figure 3:
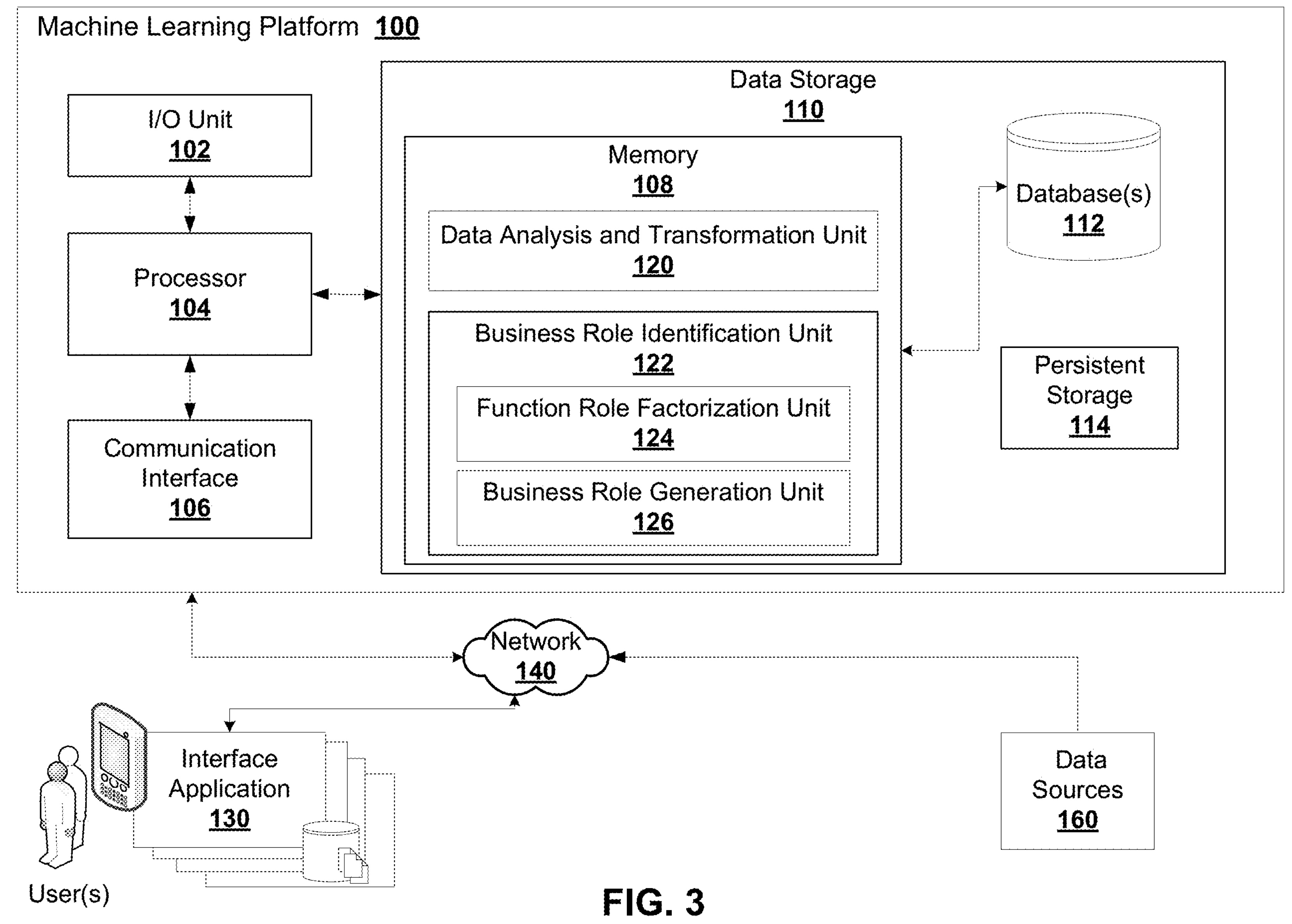
FIG. 3 illustrates, in a schematic diagram, an example of a physical environment for a machine learning platform, in accordance with some embodiments.

FIG. 3 illustrates, in a schematic diagram, an example of a physical environment for a machine learning platform 100, in accordance with some embodiments. The platform 100 may be an electronic device connected to interface application 130 and data sources 160 via network 140. The platform 100 can implement aspects of the processes described herein for business role mining.

The platform 100 may include at least one processor 104 (herein referred to as "the processor 104") and a memory 108 storing machine executable instructions to configure the processor 104 to receive a neural network (from e.g., data sources 160). The processor 104 can receive a trained neural network and/or can train a neural network using training engine 124. The platform 100 can include an I/O Unit 102, communication interface 106, and data storage 110. The processor 104 can execute instructions in memory 108 to implement aspects of processes described herein.

The platform 100 may be implemented on an electronic device and can include an I/O unit 102, a processor 104, a communication interface 106, and a data storage 110. The platform 100 can connect with one or more interface devices 130 or data sources 160. This connection may be over a network 140 (or multiple networks). The platform 100 may receive and transmit data from one or more of these via I/O unit 102. When data is received, I/O unit 102 transmits the data to processor 104.

The I/O unit 102 can enable the platform 100 to interconnect with one or more input devices, such as a keyboard, mouse, camera, touch screen and a microphone, and/or with one or more output devices such as a display screen and a speaker.

The processor 104 can be, for example, any type of general-purpose microprocessor or microcontroller, a digital signal processing (DSP) processor, an integrated circuit, a field programmable gate array (FPGA), a reconfigurable processor, or any combination thereof.

The data storage 110 can include memory 108, database(s) 112 and persistent storage 114. Memory 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 110 can include memory 108, databases 112 (e.g., graph database), and persistent storage 114.

The communication interface 106 can enable the platform 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The platform 100 can be operable to register and authenticate users (using a login, unique identifier, and password for example) prior to providing access to applications, a local network, network resources, other networks and network security devices. The platform 100 can connect to different machines or entities.

The data storage 110 may be configured to store information associated with or created by the platform 100. Storage 110 and/or persistent storage 114 may be provided using various types of storage technologies, such as solid state drives, hard disk drives, flash memory, and may be stored in various formats, such as relational databases, non-relational databases, flat files, spreadsheets, extended markup files, etc.

The memory 108 may include a data analysis and transformation unit 120 and a business role identification unit 122. The data analysis and transformation unit 120 may receive and/or obtain access privileges data of an enterprise (via processor 104 and/or database(s) 112) and transform said data into data sets as will be further described below. The business role identification unit 122 may identify one or more business roles based on common patterns of the access privileges data. The business role identification unit 122 may include a function role factorization unit 124 for factoring out function roles associated with the access privileges common to at least two employees, and a business role generation unit 126 for generating business roles based on the function roles. The function role factorization unit 124 and business role generation unit 126 will be further described below.

In one embodiment, the scope of the business role mining project is focused on capital markets where permissions fall under one of four main categories: application roles, trade book entitlements, database entitlements and infrastructure entitlements. Access data is spread across: applications, trading books, databases and infrastructure, herein referred to as access points. Depending on the nature of the business, employees are granted unique permissions to either of the access points. These are referred to as additional entitlements and are used to represent unique permissions.

In some embodiments, one step of a business role mining process involves analyzing, manipulating, and joining enterprise access data sets. Additionally, databases and infrastructure data may be generated using internal tools by specific teams handling access management currently in the enterprise. In this process, unique permissions may be isolated for careful review by line managers.

In some embodiments, another step employs various techniques from machine learning, data mining visualization clustering and matrix factorization, and principles from graph theory to identify common patterns of access. These patterns are used to establish business roles, which are packages of common accesses that can be assigned to enterprise employees. These business roles are then stored in an internal database to be interoperable with an array of existing systems across the access control ecosystem.

Figure 4:
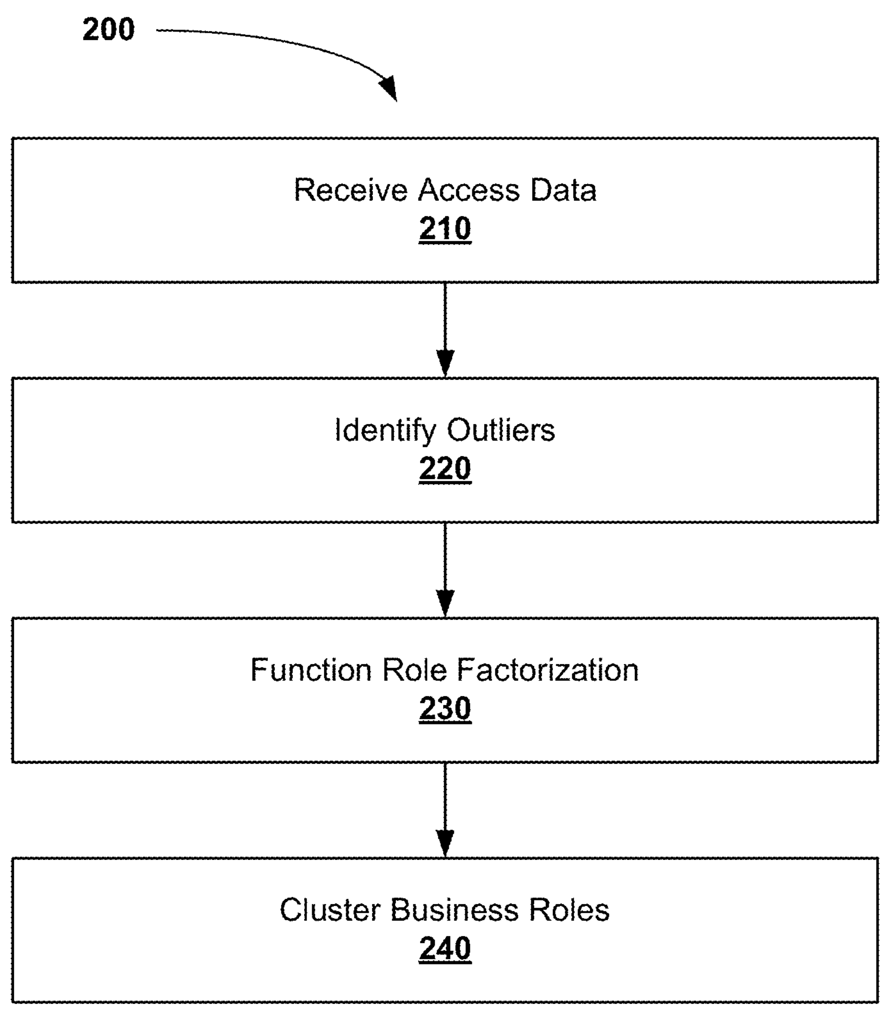
FIG. 4 illustrates, in a flowchart, an example of a method of business role mining, in accordance with some embodiments.

FIG. 4 illustrates, in a flowchart, an example of a method of business role mining 200, in accordance with some embodiments. The method 200 comprises obtaining enterprise access privileges data 210, identifying outliers 220 in the access privileges data, performing function role factorization 230 on the access privileges data, and clustering business roles 240 from the access privileges data. Access privileges data may pertain to databases, applications, infrastructure, financial books, human resource records, and transits, and stored in a repository 112. Other steps may be added to the method 200 and the method 200 will be described in further detail below.

Figure 5A:
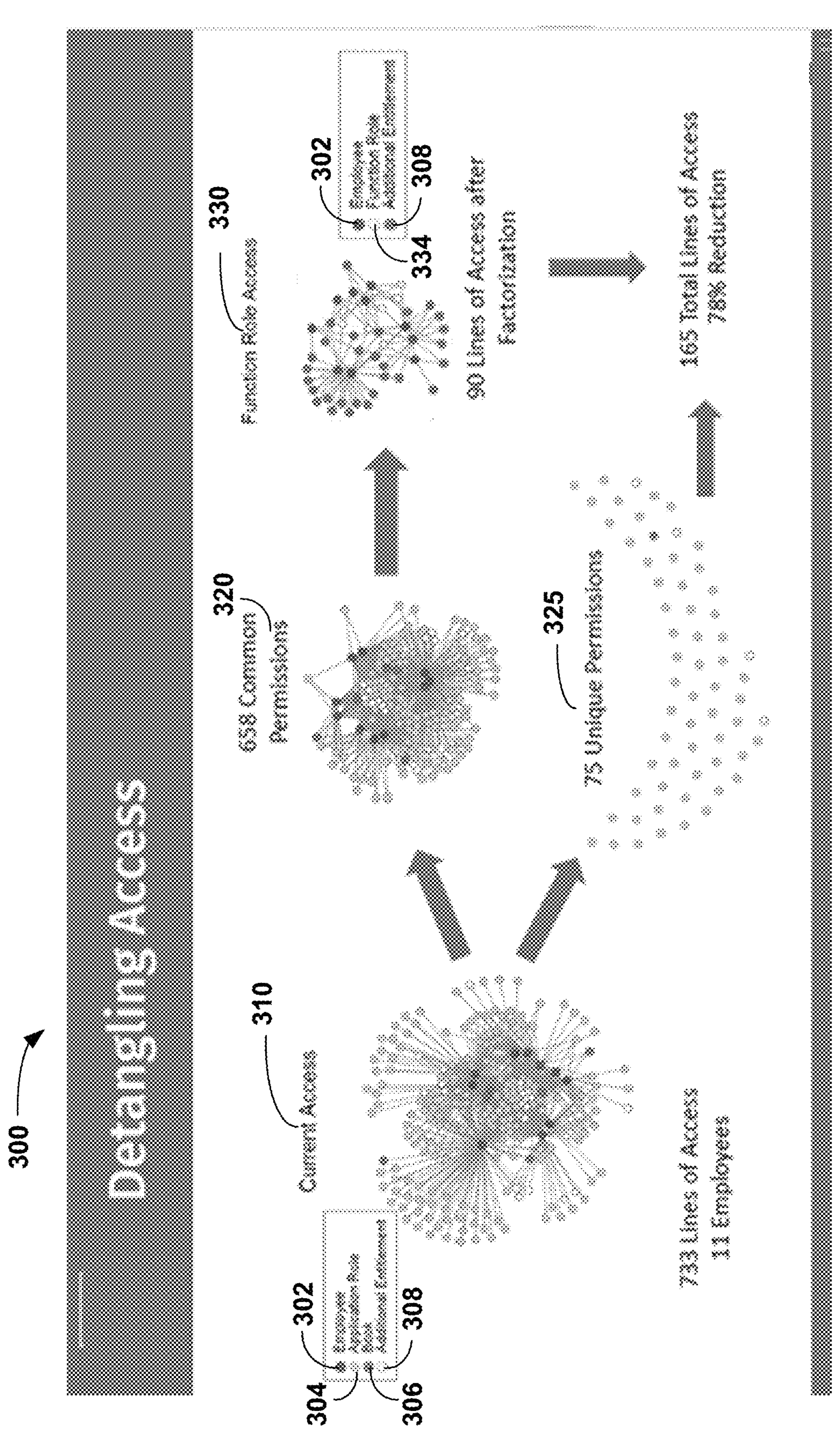
FIG. 5A illustrates, in a component diagram, an example of a visualization of the steps of outlier identification and function role factorization for an enterprise, in accordance with some embodiments.

FIG. 5A illustrates, in a component diagram, an example of a visualization 300 of the steps of outlier identification 220 (in some embodiments performed by the data analysis and transformation unit 120) and function role factorization 230 for an enterprise (in some embodiments performed by the function role factorization unit 124), in accordance with some embodiments. In this example, employees 302, application roles 304, books 306 and additional entitlements 308 are shown as nodes in graphs. A current access cluster 310 shows 733 lines of access for 11 employees. After outlier identification 220, 658 common permissions (cluster 320) and 75 unique permissions (cluster 325) were located. After function role factorization 230, a function role access cluster 330 shows the 658 common permissions reduced to 90 lines of access. The function role access cluster 330 graph shows employees 302, function roles 334 and additional entitlements 308 as nodes. Thus, in this example, the original 733 lines of access for has been reduced to 165 total lines of access.

In some embodiments, formal representations of access may include sets of users, access points and permissions. Formal representations of access may also include matrices and graphs of nodes and edges. Formal representation of access may be modelled using various mathematical frameworks, including set theory, linear algebra and graph theory. Access data may be transformed programmatically into different structures, including tabular form, matrix representation and graph representation. Once access data is transformed into data structures, algorithms and visualization may be applied. Tables 1 to 3, and FIGS. 5 to 8, illustrates different representations/transformations/visualizations of data.

Access (e.g., access privileges) may be programmatically visualized using forced directed graphs to achieve visuospatial clustering of employees based on access patterns, identify unique access privileges, identify outlier access privileges, and identify common access privileges. Edges in an access graph may directly correspond to lines of attestations for the manager.

A force directed graph is a visualization technique where data is represented in a graph structure, i.e., nodes and edges, where certain physical forces are applied to the graph. For example, in some embodiments, nodes repel each other, edges act as springs, pulling attached nodes together, and there is gravity which attracts all elements together.

In some embodiments, access privileges may be transformed access into a bipartite graph structure where users and access points are represented as nodes, and permissions are represented as edges between users and access points. A graph structure may then be rendered using forced directed graphing. The forces applied to the nodes cause a clustering such that employees that have similar access will be attracted to one another. Clustering of access may also be into three segments: common access is pulled to the center of the graph by having many edges, shared but uncommon access forms an inner layer just outside of the employee clusters, and unique access forms a perimeter around the outside of the graph.

Using this technique, the structure of access privileges in an enterprise may be visualized, cases of unique access that should be carefully attested to by managers may be identified, and natural clustering of employees based on the tools that they use may be observed.

Figure 5B:
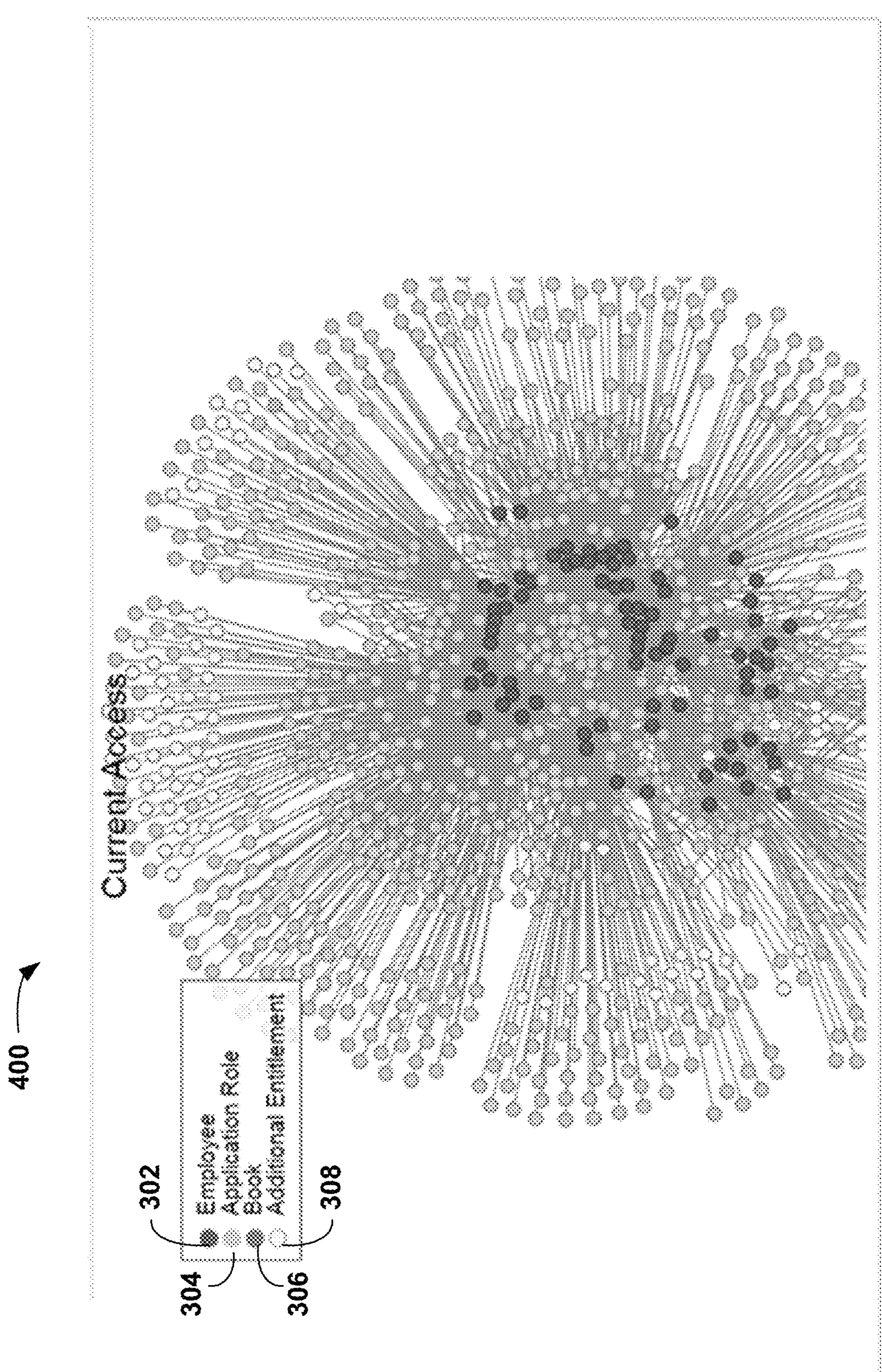
FIG. 5B illustrates, in a graph, an example of an access graph showing access privileges, in accordance with some embodiments.

FIG. 5B illustrates, in a graph, an example of an access graph 400 showing access privileges, in accordance with some embodiments. The access privilege cluster graph 400 comprises nodes for employees 302, application role 304, book 306, and additional entitlements 308. Each edge is an instance of access to which a manager is to attested. FIG. 5B represents a visualization of a current access of an employee. Each edge comprises an instance of access that is to be attested.

Figure 5C:
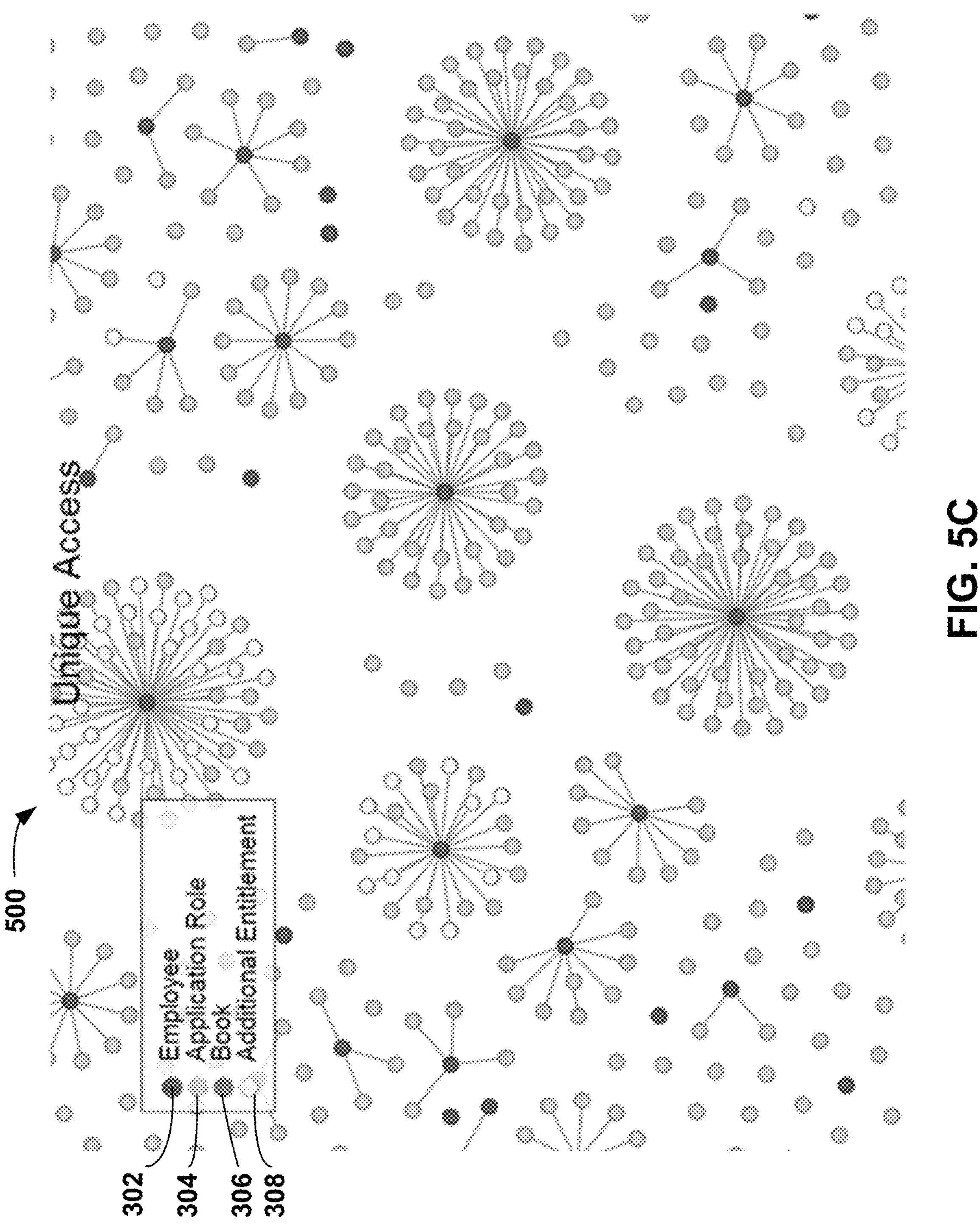
FIG. 5C illustrates, in a collection of graphs, an example of an access graph showing unique access privileges, in accordance with some embodiments.

FIG. 5C illustrates, in a collection of graphs, an example of an access graph 500 showing unique access privileges, in accordance with some embodiments. The access graph 500 corresponds to the access graph 400 with common access removed. The access graph 500 shows the unique access privileges that each employees have. Single floating access points may be ignored. The single dark nodes represent employees with no unique access privileges.

Function roles may be factored 230 using binary matrix factorization. In some embodiments, access privileges within an enterprise can be modeled as a binary matrix where rows represent users and columns represent access points. Then, given user i, and access point j, the access matrix will have a 1 at index i, j if user i has permission for access point j, 0 otherwise. This may be considered as a mapping from users to access points. See Table 2 below.

Figure 6:
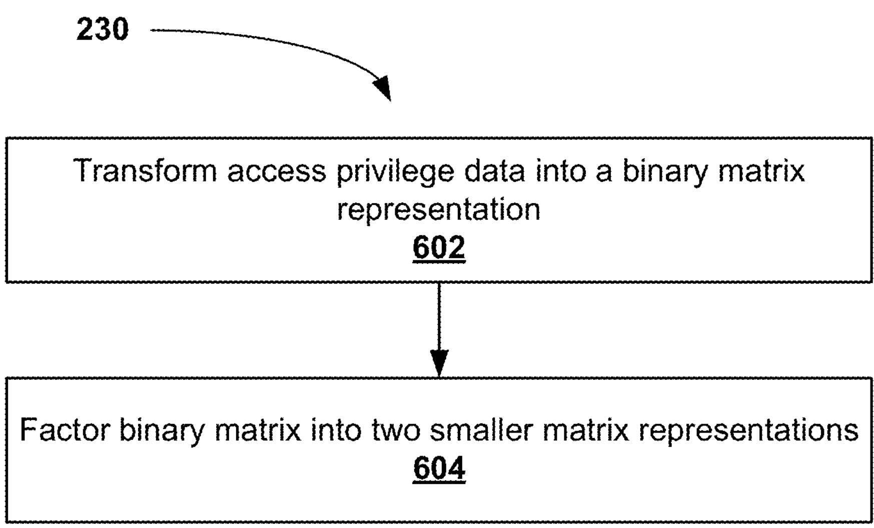
FIG. 6 illustrates, in a flowchart, an example of a method of function role factorization, in accordance with some embodiments.

FIG. 6 illustrates, in a flowchart, an example of a method of function role factorization 230, in accordance with some embodiments. In some embodiments, the method 230 may be performed by the function role factorization unit 124. The method 230 comprises transforming access into a binary matrix representation 602, and factoring the resulting access matrix into two smaller matrices 604. One of the factored matrices is a mapping from users to function roles; the other is a mapping from function roles to permissions (i.e., access points). Computing a difference in access may be performed by multiplying the factors together, and taking the difference between this product and the original access matrix (i.e., using matrix-wise logical operators such as XOR and NOT).

Table 1 illustrates an example of enterprise data before the transformation 21, 602.

TABLE 1

| Enterprise data before transformation | | |
|---|---|---|
| Employee | Enterprise Application | Enterprise Application Permission |
| Employee 1 | Application 1 | Application Role 1 |
| Employee 1 | Application 1 | Application Role 2 |
| Employee 1 | Application 2 | Application Role 3 |
| Employee 1 | Application 5 | Application Role 1 |
| Employee 2 | Application 1 | Application Role 1 |
| Employee 2 | Application 1 | Application Role 2 |
| Employee 2 | Application 2 | Application Role 3 |
| Employee 3 | Application 1 | Application Role 1 |
| Employee 3 | Application 1 | Application Role 2 |
| Employee 3 | Application 2 | Application Role 3 |
| Employee 3 | Application 3 | Application Role 1 |
| Employee 3 | Application 4 | Application Role 1 |
| Employee 3 | Application 4 | Application Role 2 |
| Employee 4 | Application 1 | Application Role 1 |
| Employee 4 | Application 1 | Application Role 2 |

TABLE 1-continued

| Enterprise data before transformation | | |
|---|---|---|
| Employee | Enterprise Application | Enterprise Application Permission |
| Employee 4 | Application 2 | Application Role 3 |
| Employee 5 | Application 1 | Application Role 2 |
| Employee 5 | Application 2 | Application Role 3 |
| Employee 6 | Application 1 | Application Role 2 |
| Employee 6 | Application 2 | Application Role 3 |
| Employee 7 | Application 1 | Application Role 2 |
| Employee 7 | Application 2 | Application Role 3 |
| Employee 7 | Application 5 | Application Role 1 |
| Employee 8 | Application 1 | Application Role 1 |
| Employee 8 | Application 1 | Application Role 2 |
| Employee 8 | Application 2 | Application Role 3 |
| Employee 9 | Application 1 | Application Role 1 |
| Employee 9 | Application 1 | Application Role 2 |
| Employee 9 | Application 2 | Application Role 3 |
| Employee 10 | Application 1 | Application Role 2 |
| Employee 10 | Application 2 | Application Role 3 |
| Employee 10 | Application 5 | Application Role 1 |

Table 2 illustrates an example of the enterprise data of Table 1 after transformation. Table 2 illustrates an example of a user-to-permissions mapping matrix. The table shows application role permissions and employees. A "1" indicates that an employee has access privileges (i.e., permission) for that application role. A "0" indicates that the employee does not have access privileges for that application role. Table 2 represents 11 rows and 185 columns (only 7 shown).

TABLE 2

| User-to-Permission Mapping Matrix | | | | | | | |
|---|---|---|---|---|---|---|---|
| Appl. Role | Perm. 1 | Perm. 2 | Perm. 3 | Perm. 4 | Perm. 5 | Perm. 6 | Perm. 7 |
| Employee 1 | 1 | 1 | 1 | 0 | 0 | 0 | 1 |
| Employee 2 | 1 | 1 | 1 | 0 | 0 | 0 | 0 |
| Employee 3 | 1 | 1 | 1 | 1 | 1 | 1 | 0 |
| Employee 4 | 1 | 1 | 1 | 0 | 0 | 0 | 0 |
| Employee 5 | 0 | 1 | 1 | 0 | 0 | 0 | 0 |
| Employee 6 | 0 | 1 | 1 | 0 | 0 | 0 | 0 |
| Employee 7 | 0 | 1 | 1 | 0 | 0 | 0 | 1 |
| Employee 8 | 1 | 1 | 1 | 0 | 0 | 0 | 0 |
| Employee 9 | 1 | 1 | 1 | 0 | 0 | 0 | 0 |
| Employee 10 | 0 | 1 | 1 | 0 | 0 | 0 | 1 |
| All Employees | 6 | 10 | 10 | 1 | 1 | 1 | 3 |

Table 3 illustrates an example of the enterprise data of Table 1 after transformation. Table 3 illustrates an example of a user-to-function roles mapping matrix. The table shows function roles and employees with indications where an employee has an access privileges for the function role.

TABLE 3

| User-to-Function Role Mapping Matrix | | | | | | |
|---|---|---|---|---|---|---|
| | Function Role 1 | Function Role 2 | Function Role 3 | Function Role 4 | Function Role 5 | Function Role 6 |
| Employee 1 | 1.0 | 0.0 | 1.0 | 0.0 | 1.0 | 1.0 |
| Employee 2 | 0.0 | 0.0 | 0.0 | 0.0 | 0.0 | 1.0 |
| Employee 3 | 0.0 | 1.0 | 1.0 | 1.0 | 0.0 | 0.0 |
| Employee 4 | 0.0 | 0.0 | 0.0 | 0.0 | 1.0 | 1.0 |
| Employee 5 | 0.0 | 0.0 | 0.0 | 1.0 | 0.0 | 0.0 |
| Employee 6 | 0.0 | 0.0 | 0.0 | 1.0 | 0.0 | 0.0 |
| Employee 7 | 1.0 | 0.0 | 1.0 | 1.0 | 1.0 | 0.0 |
| Employee 8 | 0.0 | 0.0 | 0.0 | 0.0 | 0.0 | 0.0 |
| Employee 9 | 0.0 | 1.0 | 1.0 | 0.0 | 1.0 | 1.0 |
| Employee 10 | 1.0 | 0.0 | 0.0 | 1.0 | 1.0 | 0.0 |

Table 4 illustrates an example of a mapping from function roles to permissions. The table shows permissions and function roles with indications where a function role has access privileges for an application role. Table 4 represents 6 rows and 137 columns (only 6 permission columns are shown).

TABLE 4

| Function Role to Permission Mapping Matrix | | | | | | |
|---|---|---|---|---|---|---|
| | Perm. 1 | Perm. 2 | Perm. 3 | Perm. 4 | Perm. 5 | Perm. 6 |
| Function Role 1 | 0.0 | 0.0 | 0.0 | 1.0 | 0.0 | 0.0 |
| Function Role 2 | 1.0 | 0.0 | 0.0 | 0.0 | 0.0 | 0.0 |
| Function Role 3 | 0.0 | 0.0 | 0.0 | 0.0 | 0.0 | 1.0 |
| Function Role 4 | 0.0 | 1.0 | 1.0 | 0.0 | 0.0 | 0.0 |
| Function Role 5 | 0.0 | 0.0 | 0.0 | 0.0 | 0.0 | 0.0 |
| Function Role 6 | 1.0 | 1.0 | 1.0 | 0.0 | 1.0 | 0.0 |

Tables 3 and 4 may be are derived using binary matrix factorization. The difference in access before and after applying function roles can be computed by comparing the product of these matrices with the original access matrix.

In some embodiments, between 52.6 and 77.5 percent reduction in attestation sized may be obtained depending on the team and tuning of the factorization algorithm.

Access may be considered as "detangled" by packaging the most common patterns into function roles. The number of edges in a graph is reduced. I.e., attestations are reduced. Access points that are not placed into function roles may be considered as outliers and given business inspection. A metric called "coverage" may be derived. Coverage is the percentage of access points which get bucketed into some function role by a visualization of function roles algorithm. A visualization of function roles algorithm may be tuned for coverage.

Figure 7:
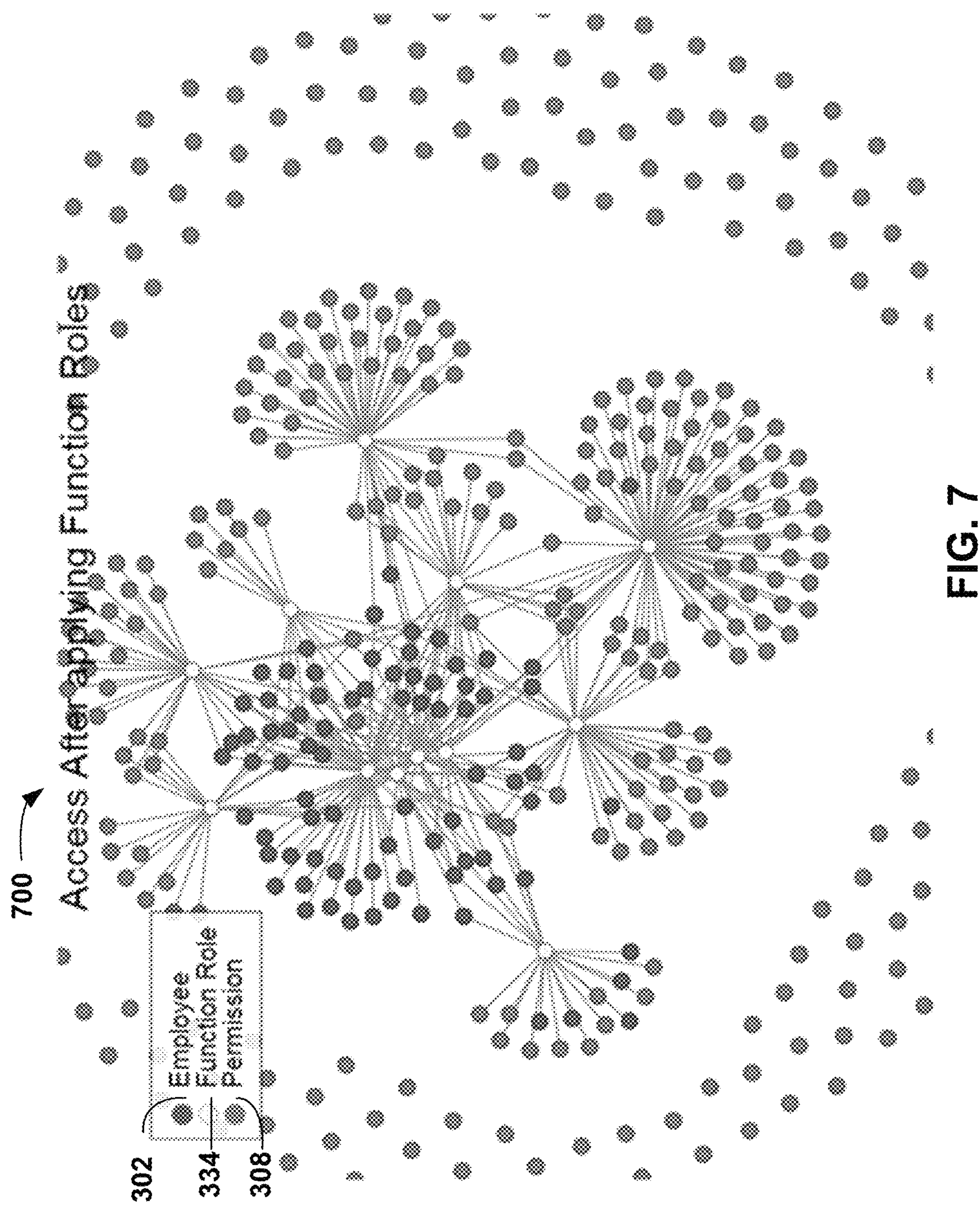
FIG. 7 illustrates, in a graph, an example of an access graph showing access after the application of function roles, in accordance with some embodiments.

FIG. 7 illustrates, in a graph, an example of an access graph 700 showing access after the application of function roles, in accordance with some embodiments. The permission nodes floating around the perimeter are common permissions that have not been assigned to function roles. After applying function roles, the access graph has gone from bipartite to tripartite. This means that instead of edges going from users, to access points directly, now there is an intermediary node type of function role. Edges are now only from users to function roles, and from function roles to access points.

Figure 8:
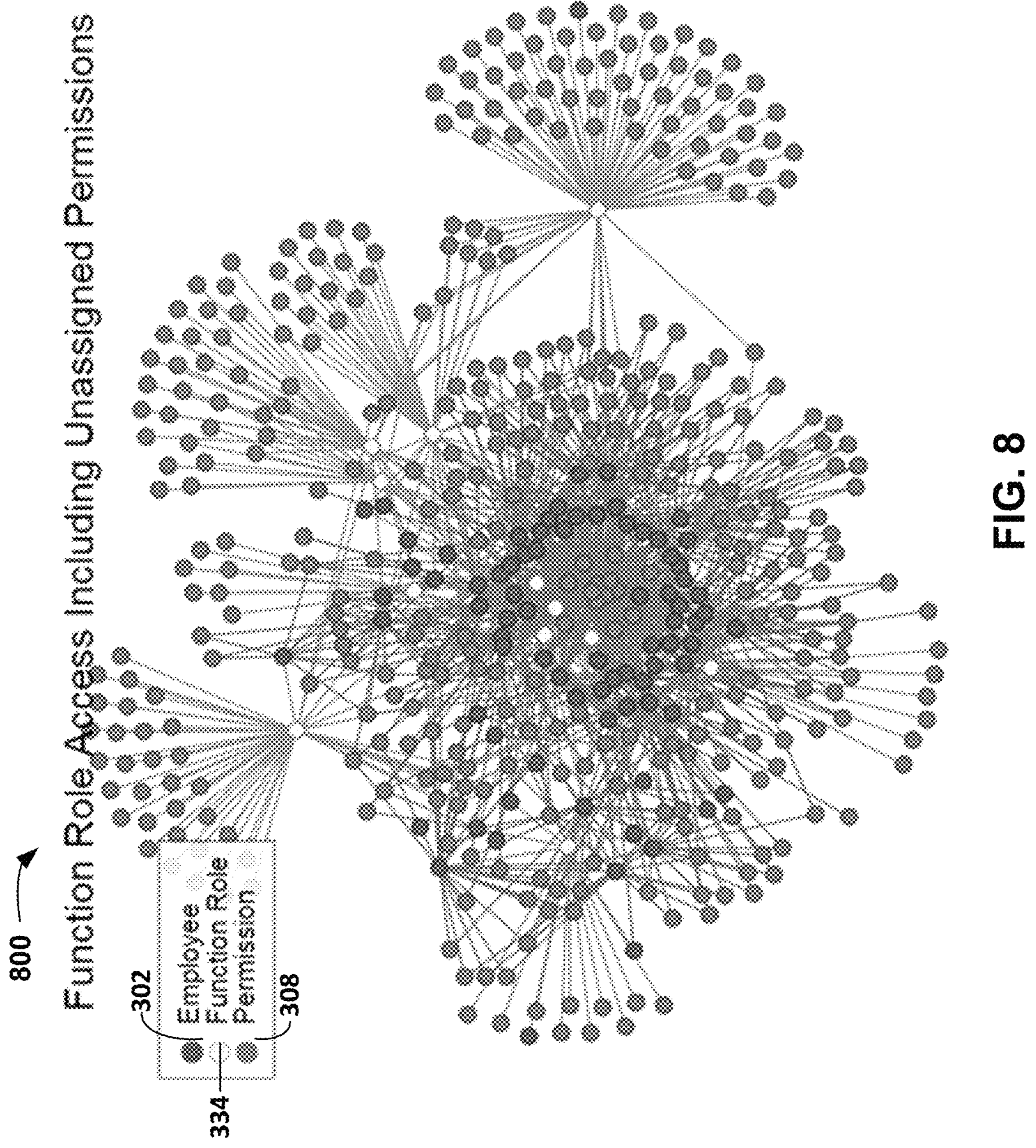
FIG. 8 illustrates, in a graph, an example of an access graph showing function role access including unassigned permissions, in accordance with some embodiments.

FIG. 8 illustrates, in a graph, an example of an access graph 800 showing function role access including unassigned permissions, in accordance with some embodiments. FIG. 8 shows a visualization of access after applying function roles, with non-assigned access points joined back to the users with access to them.

It should be noted that FIGS. 7 and 8 could be simplified by not showing the access points that function roles represent, such as in the visualizations shown in FIG. 5A.

To generate business roles as clusters of employees, employees may be clustered into business roles 240. An employee feature vector may be composed of employee human resources (HR) data along with a function role assignment. Clustering may be compared and validated against a visuospatial clustering produced by the forced directed graph. The labelling of each employee with a business role may be considered as a machine learning problem. If there are no existing business role labeled employees, then the problem becomes an unsupervised learning problem.

Figure 9:
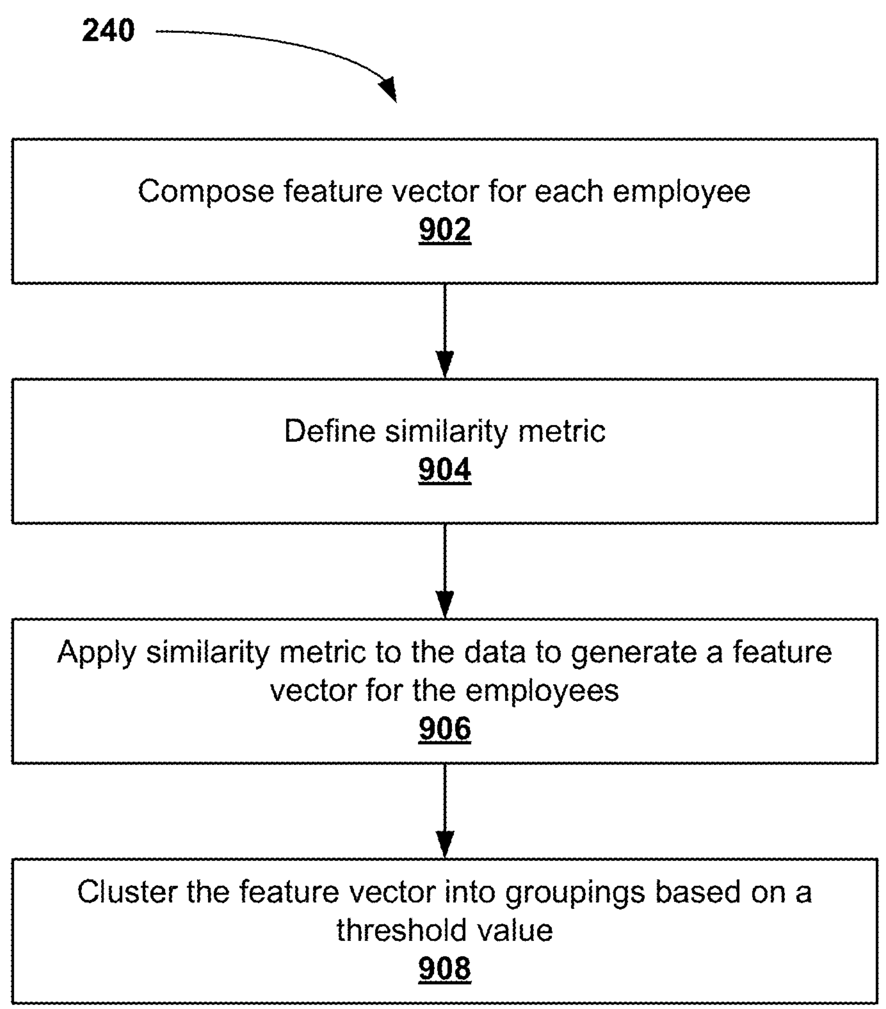
FIG. 9 illustrates, in a flowchart, an example of a method of clustering employees into business roles, in accordance with some embodiments.

FIG. 9 illustrates, in a flowchart, an example of a method of clustering employees into business roles 240, in accordance with some embodiments. The method comprises transforming 902 the access privileges data into a numerical representation, defining 904 a similarity metric, applying 906 the similarity metric to the transformed data which results in a feature vector for the employees, and clustering 908 the feature vector into groupings based on a threshold value for the features. The method 900 will be further described below.

A feature vector (e.g., numerical representation) may be composed 902 for the employees. In some embodiments, an employee feature vector may comprise information on which function roles that the employee has been assigned, as well as categorical HR data associated with that employee. The function role portion directly embeds application usage patterns into that employees feature vector. The HR data may comprise attributes such as Transit (e.g., an enterprise cost centre assigned to an employee), Bufugu (e.g., an employee's business unit/functional unit/geographic unit at the enterprise), City, manager, and job title.

TABLE 4

| Employee Feature Vectors | | | | | | | | | | | | | |
|---|---|---|---|---|---|---|---|---|---|---|---|---|---|
| Ee No. | Bufugu | City | Transit Number | FR 1 | FR 2 | FR 3 | FR 4 | FR 5 | FR 6 | FR 7 | FR 8 | FR 9 | FR 10 |
| 1 | C12 | Toronto | 3536 | 0 | 1 | 1 | 0 | 1 | 1 | 0 | 0 | 1 | 0 |
| 2 | C12 | Toronto | 3536 | 0 | 0 | 0 | 1 | 1 | 0 | 0 | 1 | 0 | 0 |
| 3 | C20 | Toronto | 18026 | 1 | 0 | 0 | 1 | 0 | 0 | 0 | 0 | 0 | 1 |
| 4 | C12 | Toronto | 3536 | 0 | 0 | 0 | 1 | 1 | 0 | 0 | 1 | 0 | 0 |
| 5 | C12 | Toronto | 3536 | 0 | 1 | 0 | 0 | 0 | 0 | 0 | 0 | 0 | 0 |
| 6 | C12 | Calgary | 7189 | 0 | 1 | 0 | 0 | 0 | 0 | 0 | 0 | 0 | 0 |
| 7 | C20 | Calgary | 18048 | 0 | 1 | 1 | 0 | 0 | 0 | 0 | 0 | 0 | 0 |
| 8 | C12 | Calgary | 7189 | 0 | 0 | 0 | 0 | 1 | 0 | 1 | 1 | 1 | 1 |
| 9 | C12 | Calgary | 7189 | 0 | 0 | 0 | 1 | 0 | 1 | 0 | 1 | 0 | 1 |
| 10 | C12 | Calgary | 7189 | 0 | 1 | 1 | 0 | 0 | 0 | 0 | 0 | 0 | 0 |

Table 4 shows an example of the feature vector for a clustering algorithm. The first few columns correspond to HR data and the last 10 columns correspond to function roles generated from the first step of the approach. The motivation behind concatenating these columns together is to include access patterns of each of the employees and also the effect of other attributes like transit and city which are currently being used in the enterprise to mine these roles manually. The algorithm groups employees with similar features or attributes as clusters 908. These clusters correspond to business roles. While the algorithm produces an index of clusters, domain expertise of business users may be leveraged to name the function roles.

A representation of similarity for the algorithm is defined 904 by a metric. Clustering algorithms work based on a certain distance metric which follows a simple intuitive idea: the lesser the distance between two points, the more similar they are and vice-versa. It should be noted that in the context The commonality between the column names in the transformed data and the values of columns in the original dataset is shown. For example, column "city" had two values in the original dataset: Toronto and Calgary. This column is transformed into two separate columns where an employee gets assigned to "1" under "City Toronto" and "0" under "City Calgary" if the employee belongs to Toronto. The same technique may be applied to "Transit" and "Bufugu" which yield four and two additional columns, respectively. The length of the feature vector for each employee has increased from 13 to 18.

The next step is the clustering: the distance metric corresponding to similarity criteria defined 904 above is referred to as a "Yule" distance metric. The clustering algorithm should be able to calculate the distance between each of points pairwise, which may be represented as:

```
array([ 0.4        , 1.75       , 0.4        , 0.2        , 0.85714286 ,
        1.125      , 1.25       , 1.5        , 0.58823529 , 1.         ,
        0.         , 0.08695652 , 1.25       , 2.         , 0.83333333 ,
        0.66666667 , 1.42857143 , 1.         , 0.8        , 2.         ,
        1.42857143 , 1.75       , 1.17647059 , 2.         , 0.08695652 ,
        1.25       , 2.         , 0.83333333 , 0.66666667 , 1.42857143 ,
        0.42857143 , 1.28       , 1.64705882 , 0.96774194 , 0.6068966  ,
        0.42857143 , 0.3125     , 0.23529412 , 0.         , 1.64705882 ,
        1.5483871  , 0.21621622 , 0.26086957 , 0.58823529 , 0.45714286 ])
```

of the embodiments described above, each employee is being referred to as a point in the n-dimensional axes. The most commonly used distance metric is Euclidean distance. Instead of continuous real valued values, a composition of Boolean and categorical values is included in the above dataset. Thus, if each employee is thought of as a point represented by a graph node, similarity is defined as: "a node A has higher similarity to a node B than node C, if the normalized ratio of common edges between A and B is more than between A and C".

The first step in preparing the data for clustering using similarity criteria defined above is transforming 902 the data. Currently, the data is a mix of categorical and boolean variables. The categorical variables are converted to a numerical representation. This may be achieved by a "one hot encoding" technique of machine learning. For example, applying the one hot encoding technique to combination of Table 2 and Table 3 results in the table shown in FIG. 10. Each of the categories in each of the columns for categorical variables is broken up into separate columns. FIG. 10 illustrates, in a table, the transformed data 1000, in accordance with some embodiments.

These are values of distances between each pair of points. These values also serve as parameters to the algorithm. The number of clusters that the algorithm produces depends on the value of threshold distance. Thus, if someone were to pass threshold value as 100, each of the points will be in one cluster, and hence, one business role. This edge case corresponds to 100% coverage wherein every employee will be given access to every access point. The other extreme where no employee is given any access is trivial to highlight. A combination of this threshold value and the number of function roles may serve as coverage criteria.

Specifically, for the dataset described above, the approximate ideal value is 0.3 which produces the following output:

array([1, 1, 3, 1, 1, 2, 2, 2, 2, 2], dtype=int32)

Each of these numbers represent a business role assigned to the employee. In total, there were 3 business roles that were found. Intuitively, this result can be validated as follows:

1. The employee assigned Business Role 3 is the head of this team under consideration. One might reason, if any other employee under her team were to get the same business roles as the lead, and hence, the same access that can potentially jeopardize the business.

2. The last set of employees who fall under Business Role 2 are based out of Calgary. In Capital Markets, location of the employees plays a role in the access that is granted. Thus, the algorithm is able to make that distinction.

After labeling each employee with a business role, the business role clustering may be compared to the original forced direct graph clustering by coloring employee nodes in the original access graph by their assigned labels from the business role clustering.

Once the business roles have been identified, access managers may be presented, in an access management system, with at least one business role for an employee in order to confirm/approve the employee for that business role. The access management system may then automatically provide access permissions associated with the at least one business role to the employee. Thus, saving the access manager from having to approve each access permissions for each employee. If an employee is on-boarded, leaving or changing roles, then one or more access managers need only approve the new business role(s) for that employee rather than having to approve each access privilege.

In some embodiments, the system/platform 10/100 may implement one employee per role. In some embodiments, the system/platform 10/100 may be implemented such that an employee may have multiple roles.

In some embodiments, a percentage of commonality among employees and their business role(s) may be used to propose granting access to an employee that has commonality with another employee having that access. The percentage of commonality that triggers such a proposal may be modified as desired.

In some embodiments, existing bundles of roles and their respective access rights may be read and analysed by the model to find access changes that occurred in the past time period (e.g., past year). Such changes may then be applied to other employees that have similar roles.

Figure 11:
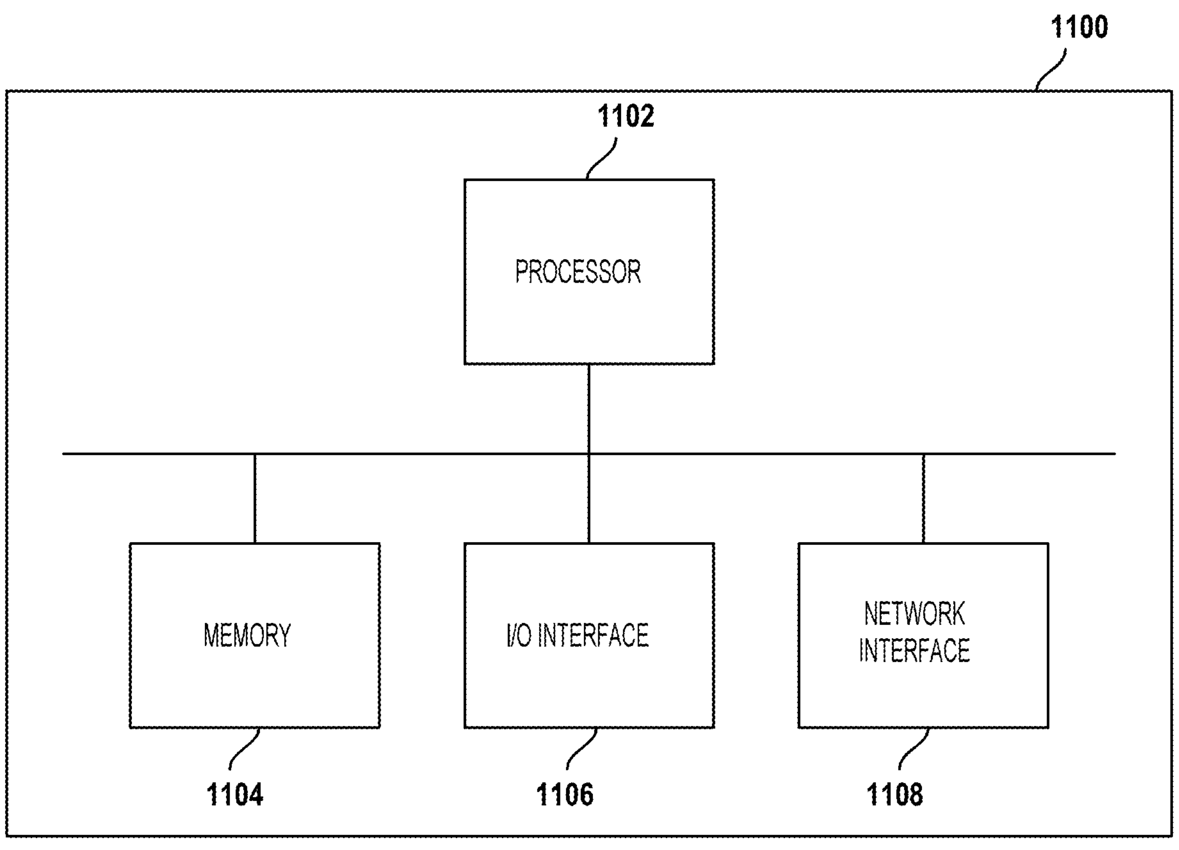
FIG. 11 is a schematic diagram of a computing device such as a server.

FIG. 11 is a schematic diagram of a computing device 1100 such as a server. As depicted, the computing device includes at least one processor 1102, memory 1104, at least one I/O interface 1106, and at least one network interface 1108.

Processor 1102 may be an Intel or AMD x86 or x64, PowerPC, ARM processor, or the like. Memory 1104 may include a suitable combination of computer memory that is located either internally or externally such as, for example, random-access memory (RAM), read-only memory (ROM), compact disc read-only memory (CDROM).

Each I/O interface 1106 enables computing device 1100 to interconnect with one or more input devices, such as a keyboard, mouse, camera, touch screen and a microphone, or with one or more output devices such as a display screen and a speaker.

Each network interface 1108 enables computing device 1100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others.

The foregoing discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, references are made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for approving access permissions, the system comprising at least one processor and memory storing instructions which when executed by the at least one processor configure the at least one processor to:

transform access data into data structures comprising a binary matrix representation by parsing the access data into a plurality of access sets comprising a user, an access point, and an electronic access permission and computing, by the at least processor, binary matrix factorization on the plurality of access sets to determine one or more binary values representative of electronic access permissions to one or more computer applications for a plurality of permission packages;

detect application usage patterns of a plurality of users based on the access data, wherein the application usage patterns are based on accessing one or more computer applications by the plurality of users;

reduce an attestation complexity of the binary matrix representation by:

generating a plurality of feature vectors based on the binary matrix representation; wherein generating the plurality of feature vectors comprises encoding categorical variables associated with user profiles into numerical representations to produce Boolean and categorical feature vectors;

clustering the plurality of feature vectors into a plurality of clustered feature vectors based on a distance metric applied pairwise to the plurality of feature vectors, wherein a total number of the plurality of clusters is determined based on a predefined threshold value;

generating user roles based on common patterns of the access data, the user roles comprising at least one access point associated with the access data, wherein the at least one access point comprises an electronic access to an electronic data set through at least one of the one or more computer applications, wherein the electronic data set comprises at least one of a computer application, a trading book, a database, infrastructure data, human resources data, and transits data;

identifying outliers of the access data;

performing a function role factorization on the access data based on the detected application usage patterns to generate the plurality of permission packages, each of the plurality of permission packages associated with at least one user role and at least one access point associated with the access data, wherein the identified outliers of the access data are not associated with a permission package of the plurality of permission packages;

generating, by the at least one processor based on the data structures, a directed graph representing the relationship between user roles, the plurality of permission packages and the at least one access point, wherein the directed graph is a tripartite graph structure, and wherein the user roles, the plurality of permission packages and the at least one access point are represented as nodes, and each relationship between a user role of the user roles and a corresponding permission package of the plurality of permission packages is represented as an edge between a node representing the user role and a node representing the corresponding permission package, and each relationship between a permission package of the plurality of permission packages and a corresponding access point of the at least one access point is represented as an edge between a node representing the permission package and a node representing the corresponding access point, wherein generating the tripartite graph structure comprises:

rendering the graph structure using forced directed graphing to apply force to the nodes; and clustering the nodes based on the plurality of permission packages to facilitate identification of the relationship between the user role and the at least one access point, wherein the clustering is tuned to increase coverage of automatic approvals and configuration of electronic access permissions, wherein the coverage represents a proportion of access points and user roles that are associated with at least one of the permission packages;

storing the directed graph tripartite graph structure with the reduced attestation complexity; and generate a user interface element to present the directed graph and a user role assignable to a user profile to an access manager, wherein the directed graph comprises a node representing the user role, wherein the directed graph comprises nodes representing at least one permission package and at least one associated access point connected to the node representing the user role;

receive an approval indication associated with the access manager assigning the user role to the user profile; and responsive to receiving the approval, automatically configure a plurality of electronic access permissions associated with the at least one permission package and the at least one associated access point enabling the user profile to access one or more computational functions using one or more computer applications associated with the assigned user role for the at least one access point associated with the assigned user role.

2. The system as claimed in claim 1, wherein the directed graph is generated based on coverage criteria, the coverage criteria comprising a threshold value for coverage and the plurality of permission packages.

3. The system as claimed in claim 1, wherein to perform the function role factorization, the at least one processor is configured to:

factor the binary matrix representation into:

a first factored matrix representing a mapping from users to the plurality of permission packages; and a second factored matrix representing a mapping from the plurality of permission packages to the access permissions.

4. The system as claimed in claim 1, wherein to cluster user roles based on common patterns of the access permissions, the at least one processor is configured to:

factor out the plurality of permission packages associated with the access permissions common to at least two user profiles; and generate user roles based on the plurality of permission packages.

5. The system as claimed in claim 4, wherein the at least one processor is configured to:

compute a difference in access by multiplying the factors together and taking the difference between the multiplied factors and an original access matrix.

6. The system as claimed in claim 1, wherein to generate a respective feature vector for each user profile, the at least one processor is configured to:

convert categorical variables into numerical representations.

7. The system as claimed in claim 1, wherein the respective feature vector comprises:

information on permission packages the user profile has been assigned; and categorical human resource data associated with the user profile.

8. A computer-implemented method of approving access permissions, the method comprising:

transforming, by at least one processor, access data into data structures comprising a binary matrix representation, wherein the transforming comprises:

parsing the access data into a plurality of access sets comprising a user, an access point, and an electronic access permission and computing, by the at least one processor, binary matrix factorization on the plurality of access sets to determine one or more binary values representative of electronic access permissions to one or more computer applications for a plurality of permission packages;

detecting application usage patterns of a plurality of users based on the access data, wherein the application usage patterns are based on accessing one or more computer applications by the plurality of users;

reducing an attestation complexity of the binary matric representation by:

generating a plurality of feature vectors based on the binary matrix representation; wherein generating the plurality of feature vectors comprises encoding categorical variables associated with user profiles into numerical representations to produce Boolean and categorical feature vectors;

clustering the plurality of feature vectors into a plurality of clustered feature vectors based on a distance metric applied pairwise to the plurality of feature vectors, wherein a total number of the plurality of clusters is determined based on a predefined threshold value;

generating, by the at least one processor, user roles based on common patterns of the access data, the user roles comprising at least one access point associated with the access data, wherein the at least one access point comprises an electronic access to an electronic data set through at least one of the one or more computer applications, wherein the electronic data set comprises at least one of a computer application, a trading book, a database, infrastructure data, human resources data, and transits data;

identifying outliers of the access data;

performing a function role factorization on the access data based on the detected application usage patterns to generate the plurality of permission packages, each of the plurality of permission packages associated with at least one user role and at least one access point associated with the access data, wherein the identified outliers of the access data are not associated with a permission package of the plurality of permission packages;

generating, by the at least one processor based on the data structures, a directed graph representing the relationship between user roles, the plurality of permission packages and the at least one access point, wherein the directed graph is a tripartite graph structure wherein the user roles, the plurality of permission packages and the at least one access point are represented as nodes, and each relationship between a user role of the user roles and a corresponding permission package of the plurality of permission packages is represented as an edge between a node representing the user role and a node representing the corresponding permission package, and each relationship between a permission package of the plurality of permission packages and a corresponding access point of the at least one access point is represented as an edge between a node representing the permission package and a node representing the corresponding access point, wherein generating the tripartite graph structure comprises:

rendering the graph structure using forced directed graphing to apply force to the nodes; and clustering the nodes based on the plurality of permission packages to facilitate identification of the relationship between the user role and the at least one access point, wherein the clustering is tuned to increase coverage to improve efficiency of automatic approvals and configuration of electronic access permissions, wherein the coverage represents a proportion of access points and user roles that are associated with at least one of the permission packages;

storing the directed graph tripartite graph structure with the reduced attestation complexity; and generating a user interface element, by the at least one processor, to present the directed graph and a user role assignable to a user profile to an access manager, wherein the directed graph comprises a node representing the user role, wherein the directed graph comprises nodes representing at least one permission package and at least one associated access point connected to the node representing the user role;

receiving, by the at least one processor, an approval indication input associated with the access manager assigning the user role to the user profile; and responsive to receiving the approval, automatically configuring a plurality of electronic access permissions associated with the at least one permission package and the at least one associated access point enabling the user profile to access one or more computational functions using one or more computer applications associated with the assigned user role for the at least one access point associated with the assigned user role.

9. The method as claimed in claim 8, wherein the directed graph is generated based on coverage criteria, the coverage criteria comprising a threshold value for coverage and the plurality of permission packages.

10. The method as claimed in claim 8, wherein performing the function role factorization comprises:

factoring, by at least one processor, the binary matrix representation into:

a first factored matrix representing a mapping from users to the plurality of permission packages; and a second factored matrix representing a mapping from the plurality of permission packages to the access permissions.

11. The method as claimed in claim 8, wherein clustering user roles based on common patterns of the access permissions comprises:

factoring out, by at least one processor, the plurality of permission packages associated with the access permissions common to at least two user profiles; and generating, by at least one processor, user roles based on the plurality of permission packages.

12. The method as claimed in claim 11, comprising:

computing, by at least one processor, a difference in access by multiplying the factors together and taking the difference between the multiplied factors and an original access matrix.

13. The method as claimed in claim 8, wherein generating a respective feature vector for each user profile comprises:

converting, by at least one processor, categorical variables into numerical representations.

14. The method as claimed in claim 8, wherein the respective feature vector comprises:

information on permission packages the user profile has been assigned; and categorical human resource data associated with the user profile.

15. A non-transitory computer-readable medium having instructions thereon which, when executed by a processor, perform:

transforming access data into data structures comprising a binary matrix representation by parsing the access data into a plurality of access sets comprising a user, an access point, and an electronic access permission and computing binary matrix factorization on the plurality of access sets to determine one or more binary values representative of electronic access permissions to one or more computer applications for a plurality of permission packages;

detecting application usage patterns of a plurality of users based on the access data, wherein the application usage patterns are based on accessing one or more computer applications by the plurality of users;

reducing an attestation complexity of the binary matric representation by:

generating a plurality of feature vectors based on the binary matrix representation; wherein generating the plurality of feature vectors comprises encoding categorical variables associated with user profiles into numerical representations to produce Boolean and categorical feature vectors;

clustering the plurality of feature vectors into a plurality of clustered feature vectors based on a distance metric applied pairwise to the plurality of feature vectors, wherein a total number of the plurality of clusters is determined based on a predefined threshold value;

generating user roles based on common patterns of the access data, the user roles comprising at least one access point associated with the access data, wherein the at least one access point comprises an electronic access to an electronic data set through at least one of the one or more computer applications, wherein the electronic data set comprises at least one of a computer application, a trading book, a database, infrastructure data, human resources data, and transits data;

identifying outliers of the access data;

performing a function role factorization of the access data based on the detected application usage patterns to generate the plurality of permission packages, each of the plurality of permission packages associated with at least one user role and at least one access point associated with the access data, wherein the identified outliers of the access data are not associated with a permission package of the plurality of permission packages;

generating, by the processor based on the data structures, a directed graph representing the relationship between user roles, the plurality of permission packages and the at least one access point, wherein the directed graph is a tripartite graph structure wherein the user roles, the plurality of permission packages and the at least one access point are represented as nodes, and each relationship between a user role of the user roles and a corresponding permission package of the plurality of permission packages is represented as an edge between a node representing the user role and a node representing the corresponding permission package, and each relationship between a permission package of the plurality of permission packages and a corresponding access point of the at least one access point is represented as an edge between a node representing the permission package and a node representing the corresponding access point, wherein generating the tripartite graph structure comprises:

rendering the graph structure using forced directed graphing to apply force to the nodes; and clustering the nodes based on the plurality of permission packages to facilitate identification of the relationship between the user role and the at least one access point, wherein the clustering is tuned to increase coverage to improve efficiency of automatic approvals and configuration of electronic access permissions, wherein the coverage represents a proportion of access points and user roles that are associated with at least one of the permission packages;

storing the directed graph tripartite graph structure with the reduced attestation complexity; and generating a user interface element to present the directed graph and a user role assignable to a user profile to an access manager, wherein the directed graph comprises a node representing the user role, wherein the directed graph comprises nodes representing at least one permission package and at least one associated access point connected to the node representing the user role; and receiving an approval indication input associated with the access manager assigning the user role to the user profile; and responsive to receiving the approval, automatically configuring a plurality of electronic access permissions associated with the at least one permission package and the at least one associated access point enabling the user profile to access one or more computational functions using one or more computer applications associated with the assigned user role for the at least one access point associated with the assigned user role.

* * * * *